(12) United States Patent
Taher et al.

(10) Patent No.: US 11,500,673 B2
(45) Date of Patent: Nov. 15, 2022

(54) DYNAMICALLY GENERATING AN OPTIMIZED PROCESSING PIPELINE FOR TASKS

(71) Applicant: INTERNATIONAL BUSINESS MACHINES CORPORATION, Armonk, NY (US)

(72) Inventors: Luke Taher, Heswall (GB); Diogo Alexandre Ferreira Ramos, London (GB); Vinh Tuan Thai, Jacob's Island (IE)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 17/009,806

(22) Filed: Sep. 2, 2020

(65) Prior Publication Data

US 2022/0066813 A1 Mar. 3, 2022

(51) Int. Cl.
*G06F 9/46* (2006.01)
*G06F 9/48* (2006.01)

(52) U.S. Cl.
CPC .......... *G06F 9/485* (2013.01); *G06F 9/4881* (2013.01)

(58) Field of Classification Search
CPC ............................... G06F 9/485; G06F 9/4881
See application file for complete search history.

(56) References Cited

U.S. PATENT DOCUMENTS

| 4,187,539 A | 2/1980 | Eaton | |
| 5,450,588 A * | 9/1995 | Hoxey | G06F 8/4451 712/207 |
| 6,611,956 B1 * | 8/2003 | Ogawa | G06F 8/443 717/152 |
| 7,644,256 B2 | 1/2010 | Nordmark | |
| 7,788,402 B1 * | 8/2010 | Keller | H04L 69/08 709/200 |
| 8,095,508 B2 | 1/2012 | Chamberlain | |
| 8,151,282 B2 | 4/2012 | Carnahan | |
| 9,170,812 B2 | 10/2015 | Vorbach | |
| 9,396,037 B2 | 7/2016 | Morsi | |
| 10,540,203 B2 | 1/2020 | Ravindran | |

(Continued)

OTHER PUBLICATIONS

Jianbing Ni , Student Member, IEEE, Kuan Zhang , Member, IEEE, Yong Yu , Member, IEEE, Xiaodong Lin , Fellow, IEEE, and Xuemin (Sherman) Shen; Providing Task Allocation and Secure Deduplication for Mobile Crowdsensing via Fog ComputingProviding Task Allocation and Secure; May/Jun. 2020.*

(Continued)

*Primary Examiner* — Camquy Truong

(74) *Attorney, Agent, or Firm* — L. Jeffrey Kelly

(57) ABSTRACT

A method for dynamically generating an optimized processing pipeline for tasks is provided. The method identifies one or more tasks to be executed from defined tasks that are defined declaratively as a number of stages of input data, data transformations, and output data. The method processes the identified tasks to determine dependencies between the tasks based on their defined stages and creates one or more optimized data processing pipelines by performing a dependency resolution procedure on stages of all tasks in parallel using the task dependencies to determine the order of the stages and removing duplication of stages between tasks.

20 Claims, 11 Drawing Sheets

(56) References Cited

U.S. PATENT DOCUMENTS

| | | | | |
|---|---|---|---|---|
| 2006/0058949 | A1* | 3/2006 | Fogel | G01C 21/3673 |
| | | | | 345/629 |
| 2008/0052675 | A1* | 2/2008 | Wookey | G06F 8/61 |
| | | | | 717/104 |
| 2008/0140692 | A1* | 6/2008 | Gehring | G06F 16/254 |
| 2008/0320284 | A1* | 12/2008 | Grzywna | G06T 1/20 |
| | | | | 712/E9.016 |
| 2017/0075966 | A1* | 3/2017 | Greene | G06F 16/254 |
| 2019/0347765 | A1* | 11/2019 | Maier | G06T 5/30 |
| 2019/0384635 | A1 | 12/2019 | Seif | |

OTHER PUBLICATIONS

Wikipedia, "Topological sorting," https://en.wikipedia.org/wiki/Topological_sorting, accessed Aug. 26, 2020, 8 Pages.

Zaharia et al., "Resilient Distributed Datasets: A Fault-Tolerant Abstraction for In-Memory Cluster Computing," Electrical Engineering and Computer Sciences University of California at Berkeley, Technical Report No. UCB/ EECS-2011-82 http://www.eecs.berkeley.edu/Pubs/TechRpts/2011/EECS-2011-82.html, Jul. 19, 2011, 18 Pages.

Grace Period Disclosure: "Download IBM Netcool Operations Insight 1.6.0.1 on IBM Cloud Private," Luke Taher, Diogo Alexandre Ferreira Ramos, Vinh Tuan Thai, Oct. 31, 2019, https://www.ibm.com/support/pages/download-ibm-netcool-operations-insight-1601-ibm-cloud-private, 4 Pages.

Isard et al., "Dryad: Distributed Data-Parallel Programs from Sequential Building Blocks," EuroSys'07, Mar. 21-23, 2007, Lisboa, Portugal. 14 Pages.

Mell et al., "The NIST Definition of Cloud Computing", National Institute of Standards and Technology, Special Publication 800-145, Sep. 2011, 7 pages.

Wikipedia, "Depth-first search," https://en.wikipedia.org/wiki/Depth-first_search, accessed Aug. 26, 2020, 9 Pages.

\* cited by examiner

DYNAMICALLY GENERATING AN OPTIMIZED PROCESSING PIPELINE FOR TASKS

STATEMENT REGARDING PRIOR DISCLOSURES BY THE INVENTOR OR A JOINT INVENTOR

The following disclosure is submitted under 35 U.S.C. 102(b)(1)(A):
DISCLOSURE: "Download IBM Netcool Operations Insight 1.6.0.1 on IBM Cloud Private," Luke Taher, Diogo Alexandre Ferreira Ramos, Vinh Tuan Thai, Oct. 31, 2019.

BACKGROUND

The present invention relates to dynamically generating an optimized processing pipeline for tasks, and more specifically, for tasks defined declaratively by configuration files.

Modern software products which execute in cloud environments must be able to handle interactions from a potentially large number of users concurrently and, as such, are often required to process large quantities of data periodically or in real time. One particular approach to dealing with such requirements is to define a data processing pipeline. Data processing pipelines manipulate inbound data using a series of computational transformations. These transformations convert the inbound data into a new form, which allows the system to fulfill some task for the users such as generating viewership statistics on a video sharing website.

Typically, applications of data processing pipelines include data sanitization, data analytics and machine learning tasks. Sometimes, several of these tasks can be executed back to back. Most data processing pipelines rely on a compute framework to provide cloud scale execution.

Complex data processing pipelines require some framework in which the data processing pipeline is defined. This allows developers to configure a data processing pipeline, often via a graphical user interface or declarative configuration files. The pipeline framework typically supports multiple compute frameworks and often supports passing of data between different compute frameworks.

Typically, these pipeline frameworks allow the developer to define one or more fixed data pipelines for their cloud application. These are static pipelines which do not change without user input. This approach is sufficient for individual, fixed pipelines. However, in many applications data processing pipelines change depending on the requirements put on the system via user actions to the system. Additionally, many data pipeline tasks have shared components, often with the same or similar inbound data, similar outbound data and similar data transformation steps. These factors can result in duplicated or even unnecessary work being executed when using a static pipeline framework.

SUMMARY

According to an aspect of the present invention there is provided a computer-implemented method for dynamically generating an optimized processing pipeline for tasks, which includes: identifying one or more tasks to be executed from defined tasks that are defined declaratively as a number of stages of input data, data transformations, and output data; processing the identified tasks to determine dependencies between the tasks based on their defined stages; and creating one or more optimized data processing pipelines by performing a dependency resolution procedure on stages of all tasks in parallel using the task dependencies to determine the order of the stages and removing duplication of stages between tasks.

According to another aspect of the present invention there is provided a system for dynamically generating an optimized processing pipeline for tasks, which includes: a processor and a memory configured to provide computer program instructions to the processor to execute the function of the components: a task identifying component for identifying one or more tasks to be executed from defined tasks that are defined declaratively as a number of stages of input data, data transformations, and output data; a dependencies component for processing the identified tasks to determine dependencies between the tasks based on their defined stages; and a pipeline creating component for creating one or more optimized data processing pipelines by performing a dependency resolution procedure on stages of all tasks in parallel using the task dependencies to determine the order of the stages and removing duplication of stages between tasks.

According to a further aspect of the present invention there is provided a computer program product for dynamically generating an optimized processing pipeline for tasks, the computer program product includes a computer readable storage medium having program instructions embodied therewith, the program instructions executable by a processor to cause the processor to: identify one or more tasks to be executed from defined tasks that are defined declaratively as a number of stages of input data, data transformations, and output data; process the identified tasks to determine dependencies between the tasks based on their defined stages; and create one or more optimized data processing pipelines by performing a dependency resolution procedure on stages of all tasks in parallel using the task dependencies to determine the order of the stages and removing duplication of stages between tasks.

The computer readable storage medium may be a non-transitory computer readable storage medium and the computer readable program code may be executable by a processing circuit.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1A:
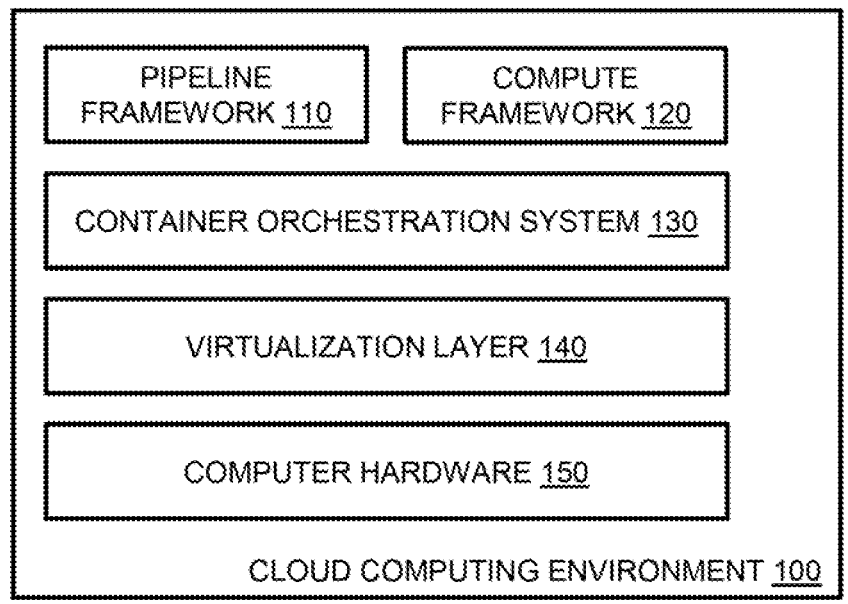
FIGS. 1A and 1B are block diagrams of an example embodiment of a system in which the present invention may be implemented.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

A method and system are described for dynamically generating an optimized processing pipeline for tasks, where the tasks are defined declaratively according to task manifests as a number of stages of data transformations.

The described method identifies one or more tasks to be executed from defined tasks that are defined declaratively as a number of stages of input data, data transformations, and output data.

The method processes the identified tasks to determine dependencies between the tasks based on their defined stages; and creating one or more optimized data processing pipelines by performing a dependency resolution procedure on stages of all tasks in parallel using the task dependencies to determine the order of the stages and removing duplication of stages between tasks.

Once one or more pipelines are generated, they are passed to the compute framework and executed using a runtime mediation program.

The described method is able to collate multiple tasks into a single pipeline and optimize the pipeline stages in real time. This optimization consists of removing tasks that are not required by the users, and de-duplication of common stages of data transformation between tasks. This provides an inherent performance benefit.

A data processing pipeline is defined by a directed acyclic graph (DAG) where the nodes of the graph represent stages of one or more tasks, and directed edges represent data dependencies between stages, and which contains no cycles.

A task is defined as series of data transformations which need to be executed on some inbound data set(s) in order to achieve one or more defined resultant data sets. Typically defined declaratively as a list of stages. A stage is defined as a single data transformation used in one or more tasks. Consisting of some combination of configuration, and procedural code written for a compute framework. The stage is executed on one or more inbound data sets using the compute framework and resulting in one or more transformed data sets.

A pipeline framework is a software framework which allows a developer to define one or more data processing pipelines via a graphical user interface, declarative configuration files, or otherwise. The framework subsequently schedules and executes each stage of the data processing pipeline using a compute framework, passing the data resulting from each stage to any subsequent stages which require it as defined by the edges of the DAG.

A compute framework is a software framework which allows a developer to define data transformations using a procedural language or otherwise. The compute framework, when invoked, will execute the data transformations on one or more input data sets producing one or more output data sets.

Referring to FIG. 1A, a schematic diagram illustrates a cloud computing environment 100 in which a pipeline framework 110 is provided in which a data processing pipeline may be defined. The pipeline framework 110 uses one or more compute frameworks 120 that are provided on a container orchestration system 130 that may be implemented as a virtualization layer 140 on computer hardware 150. This may be a standard application across the state-of-the-art pipeline frameworks 110.

A pipeline framework 110 is traditionally responsible for allowing a developer to create one or more data processing pipelines as well as being responsible for scheduling the execution of those pipelines on one or more compute frameworks 120.

Figure 1B:
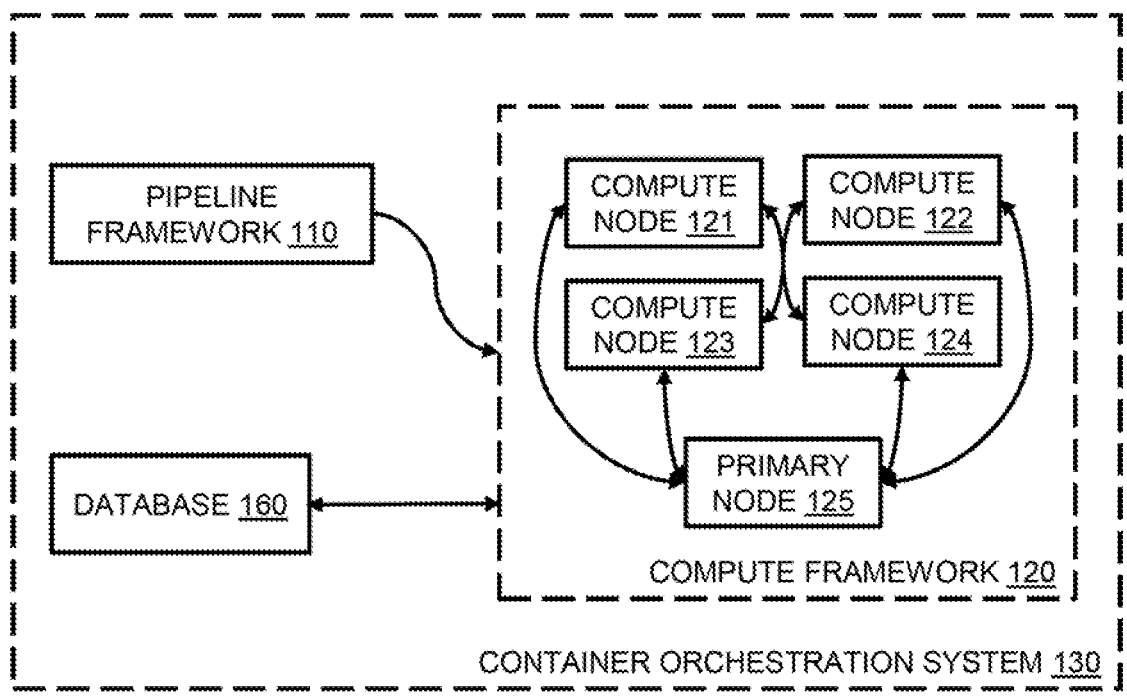

As shown in FIG. 1B, the compute framework 120 then executes the stages of the pipeline, sourcing inbound data sets from one or more databases 160, performing the data transformations of each stage of the pipeline, before outputting the resultant data sets to one or more databases 160.

The compute framework 120 typically relies on one or more compute nodes 121-124, controlled by a single primary node 125. Typically, more inbound data requires more computer hardware resource in order to complete the data transformations in a comparable amount of time. This design allows the compute framework 120 to leverage the container orchestration system 130 to request more or less compute nodes 121-124 as required by the quantity of inbound data.

In a typical pipeline framework 110, the developer defines an execution graph as a DAG with edges representing a directional data set dependency between the nodes, which are stages of the tasks to be executed. This process is typically carried out via a GUI or declarative configuration files.

Figure 2A:
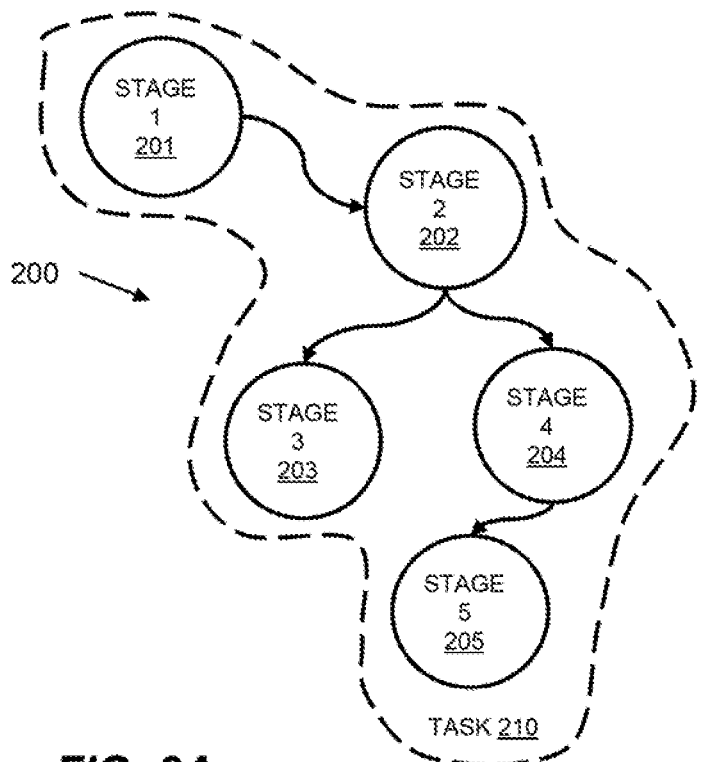
FIGS. 2A and 2B are schematic diagrams showing directed acyclic graphs of example pipelines according to at least one embodiment.

An example execution graph defined by a developer using such a framework is shown in FIG. 2A. In this example, the pipeline 200 has five nodes 201-205 representing stages of a task 210. A single node, stage 1 201, has no incoming edges, and this node is typically referred to as an input stage and is responsible for either producing data or sourcing data from a database. In addition, there are two nodes with no outgoing edges, stage 3 203 and stage 5 205, these nodes are typically referred to as output stages and are responsible for storing the resulting transformed data sets in a database.

Tasks represent a set of stages which correspond to one or more tangible results of the execution definition as defined by the system as a whole. An analytic could be a unique task.

Figure 2B:
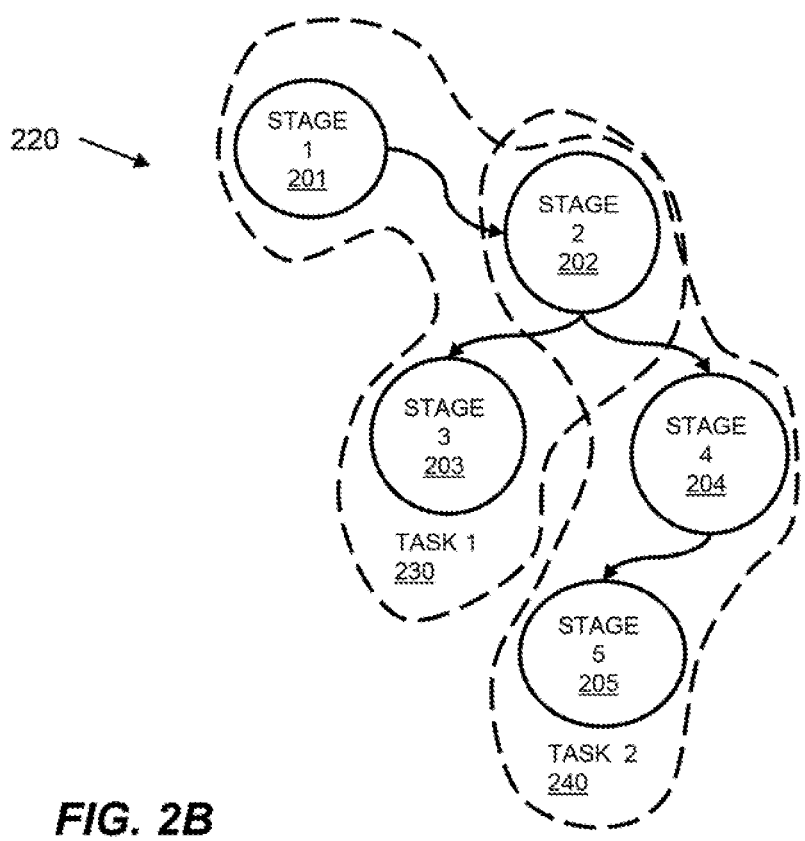

FIG. 2B is an illustration of how a pipeline 220 may consist of multiple tasks 230, 240. Tasks can consist of one or more stages 201-205, and multiple tasks within the same pipeline definition can share common stages, such as stage 2 202 in this example.

Figure 3:
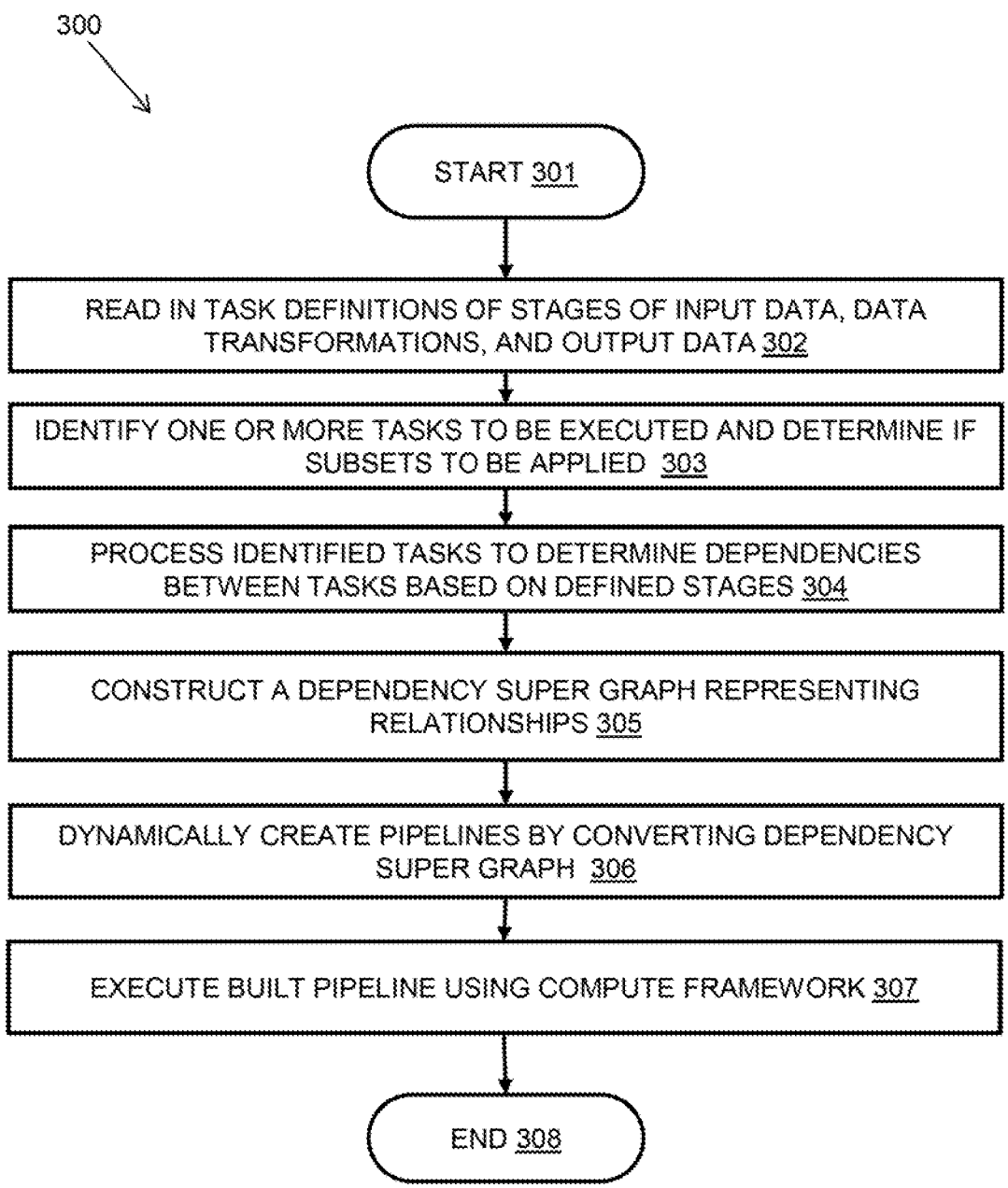
FIG. 3 is an operational flowchart illustrating a process for dynamically generating an optimized processing pipeline according to at least one embodiment.

Referring to FIG. 3, a flow diagram 300 shows an example embodiment of the described method of dynamically generating an optimized processing pipeline carried out by a pipeline framework component 110.

The method may start 301 and the pipeline framework 110 may read in 302 task definitions with each task defining of stages of input data, transformation of data, and output data. Tasks are defined declaratively according to task manifests, for example, as declarative configuration files or via a graphical user interface.

The method may identify 303 one or more tasks to be currently executed from the defined tasks. This may identify one or more tasks to be executed dynamically by a schedule maintained by the pipeline framework 110, actions performed by a user, and/or reported state changes within the system. The tasks to be executed (or not executed) may change depending on external factors in the system. This would result in dynamic change to the pipeline as different tasks would be fed into the pipeline generation.

The one or more tasks to be executed may also include identifying 303 whether to divide the tasks into multiple subsets each of which may involve creating one or more optimized data processing pipelines. The identified tasks can be processed by the remaining steps either as a whole to create a single optimized pipeline or split up into multiple subsets to create multiple optimized pipelines. The latter option is to cater for load-balancing requirements, for example. If the dependencies between the tasks result in two or more sets of stages then they will be split into two or more pipelines.

The method may process 304 the identified tasks to determine dependencies between the tasks based on their defined stages. This may include analyzing each task for inbound data dependencies to define any directional dependencies between tasks. Where the identified tasks to be executed are a subset of the defined tasks, processing 304 the identified tasks may include determining dependencies to resolve dependencies with stages from outside the subset. If there exists a stage in a given task which has inbound dependencies that cannot be resolved by the other stages associated with the same task but can be satisfied by one or more stages in other tasks, then there are one or more directional dependencies between the tasks.

The method may create one or more optimized data processing pipelines by performing a dependency resolution procedure on stages of all tasks in parallel using the task dependencies to determine the order of the stages and removing duplication of stages between tasks. This may include constructing 305 a dependency super graph of the stages of the tasks and dynamically converting 306 the graph into one or more pipelines when the tasks are scheduled for execution. The dependency super graph may be a directed acyclic graph (DAG) in which the nodes of the graph represent stages of one or more tasks, and directed edges represent data dependencies between stages and which contains no cycles. The dependency super graph refers to the relationships between the stages within the tasks, before optimization, representing the order that they must be executed in. These relationships can be represented/modelled as a DAG. The 'super' aspect here refers to the fact that all the dependency relationships between stages within all tasks are amalgamated into a single DAG.

Creating one or more optimized data processing pipelines by constructing a dependency super graph may collate multiple tasks into a single pipeline optimizing the pipeline stages in real time, wherein the optimization includes removing tasks that are not required by users and deduplicating common stages between tasks.

The identifying 303 of one or more tasks to be currently executed from the defined tasks determines which tasks need to be executed at any given time. As this is dynamic, the set of tasks which need to be executed may be constantly changing. At any given time, the set of tasks is fed into the dependency resolution algorithm to generate one or more optimized data processing pipelines. This may have to happen in real time based on the current set of tasks which need to be executed to ensure the data processing pipelines contain all the stages of all the tasks which need to be executed at that time.

The method may use a depth first search to identify if only a single optimized pipeline or multiple pipelines exist and may use a topological sorting to order stages in a pipeline to satisfy dependencies and for deduplication of stages in a defined order.

The method may convert 306 the dependency super graph into one or more pipelines if and when the tasks are scheduled for execution. The pipeline framework 110 may execute 307 the built pipelines using a compute framework. The method may then end 308.

Figure 4A:
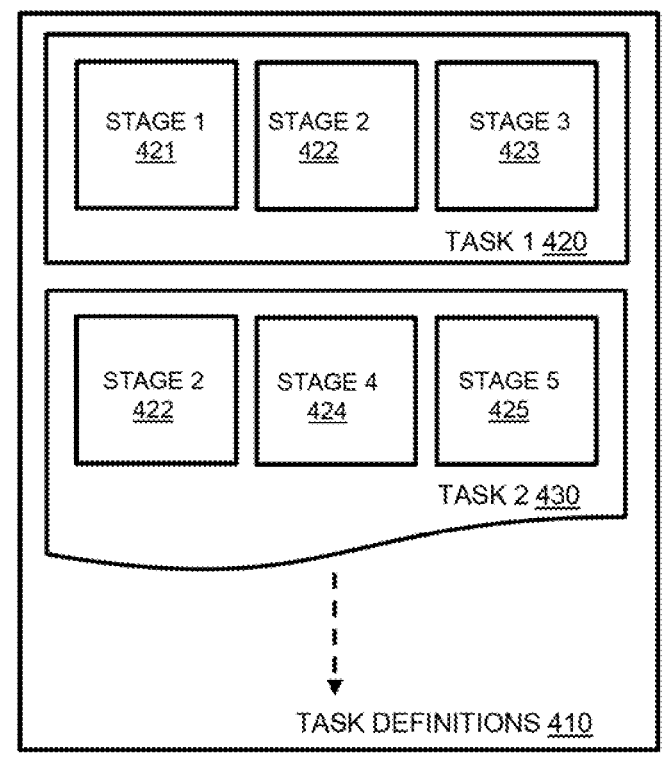
FIGS. 4A-4C are schematic diagrams showing examples of generating pipelines from task definitions according to at least one embodiment.
Figure 4A:
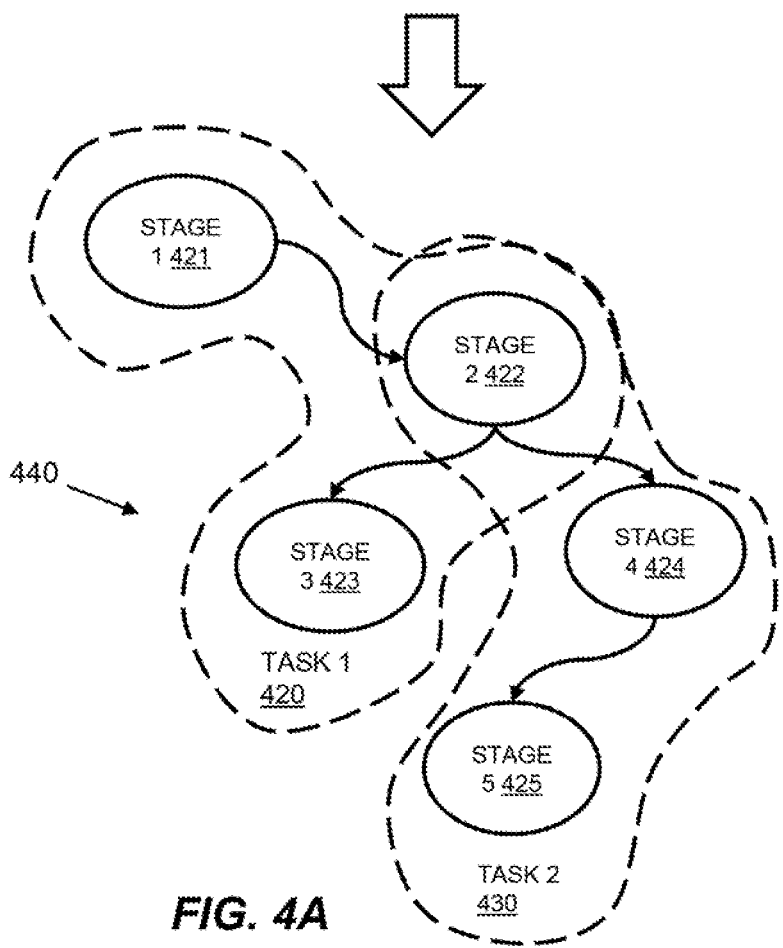

Relationships between pipeline definitions, tasks and stages, and how they are related to the pipelines generated by the pipeline framework 110 are illustrated in FIG. 4A. Referring to FIG. 4A, a schematic diagram shows task definitions 410 that are used to construct a super dependency graph for a pipeline 440 for the tasks. Task 1 420 includes Stage 1 421, Stage 2 422, and Stage 3 423. Task 2 430 includes Stage 2 422, Stage 4 424, and Stage 5 425.

FIG. 4A can be seen as the input and output of the pipeline framework's 110 pipeline generation function as described in the flow diagram 300 of FIG. 3. The single resulting pipeline 440 of this example makes it clear that Stage 1 421 needs to be executed first and foremost, Stage 2 422 is shared between the two tasks and can be deduplicated, Stage 3 423 and Stage 4 424 can be executed in parallel, and Stage 5 425 has to be run in sequence after Stage 4. 424. Before explaining how this execution order can be programmatically determined, two other major cases of the resulting pipelines are described with reference to FIG. 4B and FIG. 4C.

If only some subset of the tasks requires execution, the proposed pipeline framework 110 is able to use the list of stages associated with each task to build a pipeline which only contains stages of the required tasks. As the pipeline definition contains information describing the data set dependencies (the incoming edges of each stage) the pipeline framework 110 is able to dynamically resolve dependencies in the scenario in which a task contains no direct input stages.

Figure 4B:
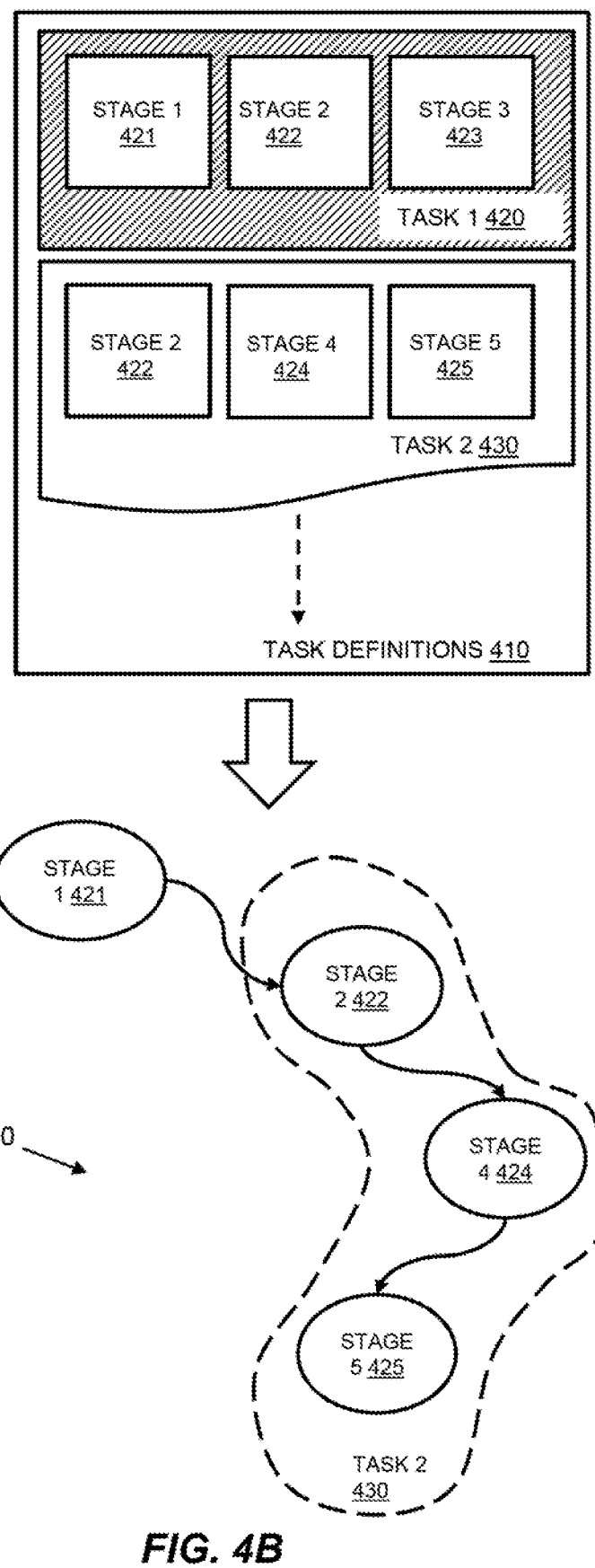

An example of this is demonstrated in FIG. 4B in which Task 1 420 is disabled (as shown in hatching), and Task 2 430 is the sole task which requires execution. The output is a dependency super graph for a pipeline 450 which includes all of the nodes in Task 2 430, as well as external nodes which are required to resolve the dangling dependency of the Stage 2 422 node required by Task 2 430 by satisfying the dependency on Stage 1 421.

Note that if when determining tasks to be executed, the set of tasks is split into subsets, this dependency resolution helps to identify stages from tasks that are placed into different subsets.

Figure 4C:
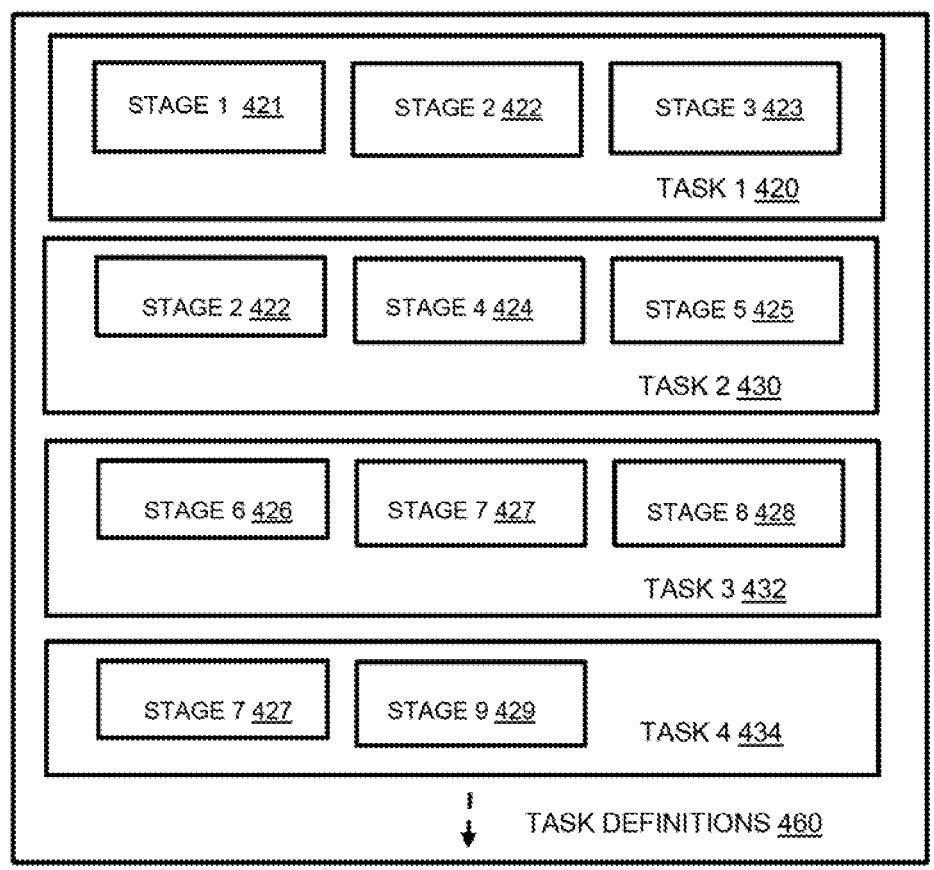
Figure 4C:
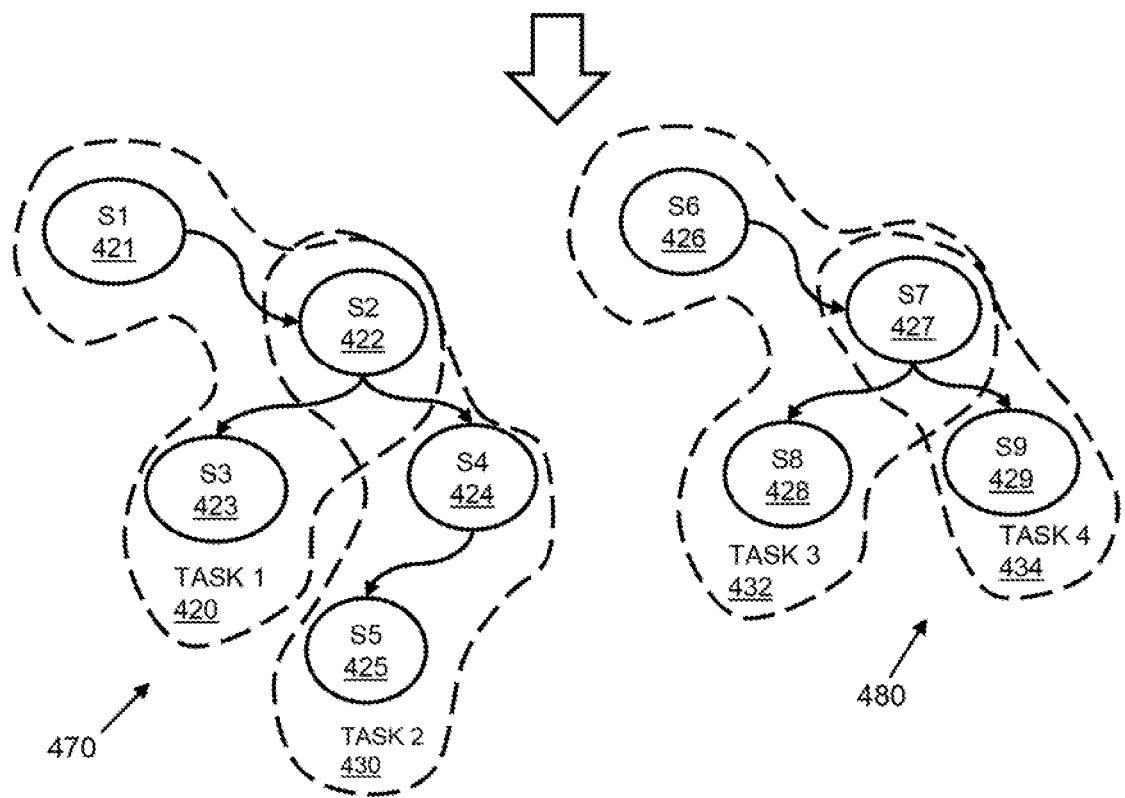

In addition, the set of tasks could exhibit more complex relationships than the above examples. For instance, this might result in more than one optimized pipeline as illustrated in the FIG. 4C. FIG. 4C shows task definitions 460 of four tasks, Task 1 420, Task 2 430, Task 3 432, Task 4 434. Task 1 420 includes Stage 1 421, Stage 2 422, and Stage 3 423. Task 2 430 includes Stage 2 422, Stage 4 424, and Stage 5 425. Task 3 432 includes Stage 6 426, Stage 7 427, and Stage 8 428. Task 4 434 includes Stage 7 427, and Stage 9 429.

In FIG. 4C, two optimized pipelines 470, 480 are generated based on the relationships between the stages of the four tasks. In this situation, the two resulting pipelines 470, 480 can be executed either in sequence or in parallel depending on the setup and/or resource constraints of the system.

Figure 5:
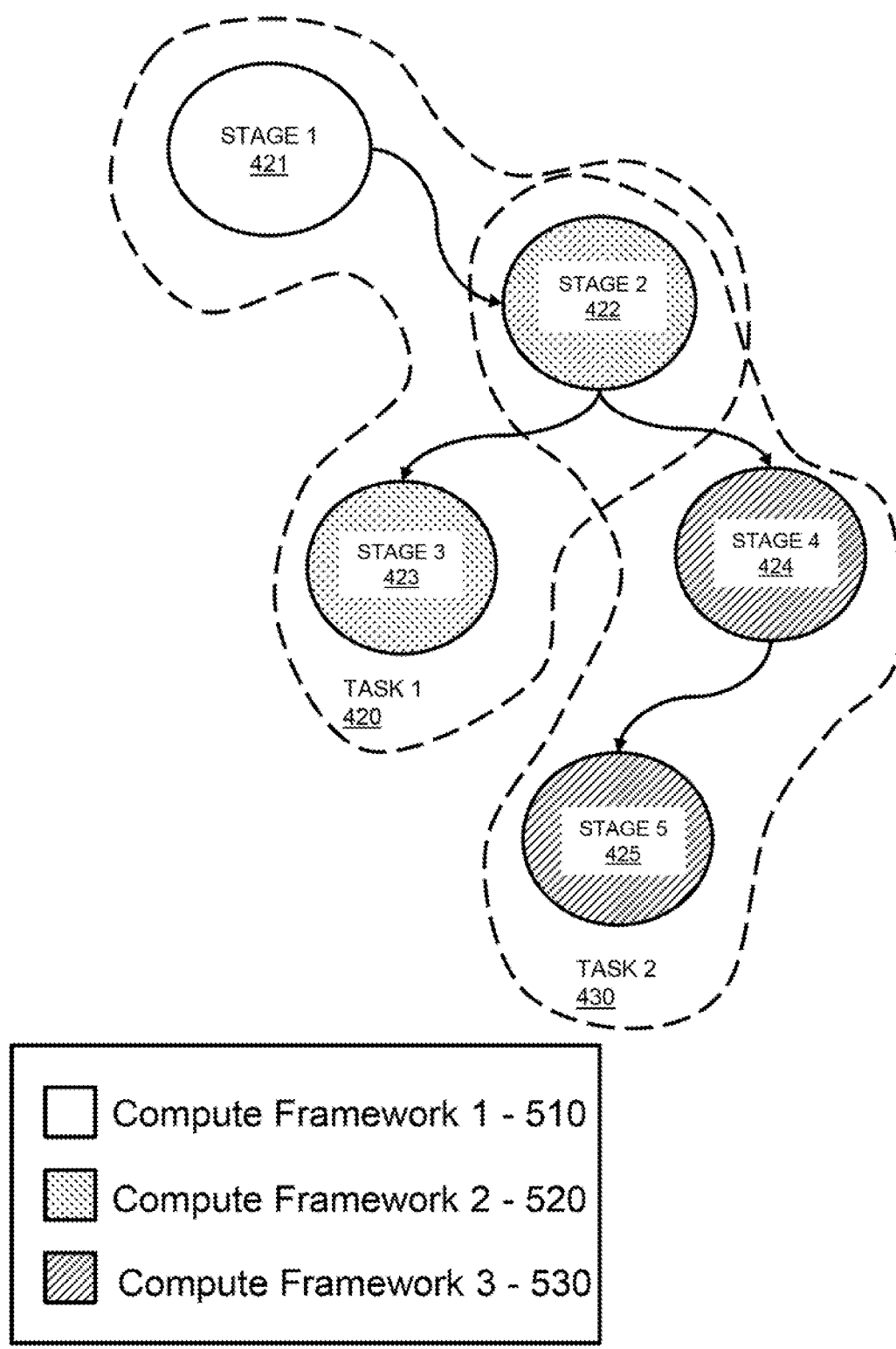
FIG. 5 is a schematic diagram showing an example of a pipeline according to at least one embodiment.

FIG. 5 is a schematic diagram 500 showing how the stages of the pipeline 440 of the example of FIG. 4A may be divided across compute frameworks. Stage 1 421 may be allocated to Compute Framework 1 510, Stage 2 422 and Stage 3 423 may be allocated to Compute Framework 2 520 and Stage 4 424 and Stage 5 425 may be allocated to Compute Framework 3 530.

To identify if only one single optimized pipeline or multiple pipelines exist, a Depth First Search may be carried out to identify connected components from the dependency super graph. Each resulting connected component forms a source for pipeline generation in the next step.

To produce a linear ordering in which the stages within each connected component identified from the previous step should be executed by the compute framework in order for all dependencies to be satisfied, a modified topological sorting method may be used to be applied on each connected component of this dependency super graph. The modified topological sort approach also allows for duplicate stages to be deduplicated in the produced execution order. Pseudocode for this process is provided in Listing. 1.

---

Listing. 1 - Pipeline generation logic.

---

```
INPUT:
    tasks // the set of tasks which require execution in a connected component
    stages // the set of all stages involved in all the tasks above
Initialize:
    requiredStages // a set to contain the stages required for the pipeline
    frontier // a queue to contain the stages in the frontier of the search
    pipeline // an ordered set of stages to be executed by the compute framework
// establish a working set of required stages
for task in tasks:
    requiredStages.addAll(task.stages)
// populate the initial frontier with the input stages
for stage in requiredStages:
    if stage.incoming.size( ) == 0:
        frontier.enqueue(stage)
    // if the current requiredStages does not contain required dependencies
    // then add them to the requiredStages set
    else if not requiredStages.containsAll(stage.incoming):
        requiredStages.addAll(stage.incoming)
// perform a topological sort to produce a linear ordering of stages which
// will be the pipeline
while not frontier.isEmpty( ):
    stage := frontier.dequeue( )
    if stage.visited:
        continue
    pipeline.add(stage)
    for reqStage in requiredStages:
        if reqStage.incoming.contains(stage):
            reqStage.incoming.remove(stage)
            if reqStage.incoming.isEmpty( ):
                frontier.enqueue(reqStage)
OUTPUT:
    pipeline // an ordered set of stages to be executed by the compute framework
```

---

Once one or more pipelines are generated, they are passed to the compute framework and executed using a runtime mediation program. This program is written to translate the generated pipelines into transformations to execute in the compute framework. The runtime mediation program schedules stage execution and passes data between stages.

Once each stage completes, the runtime mediation program stores any output data sets. When a stage to be declares an incoming stage dependency as determined from the Pipeline Definition, the runtime mediation program passes the output data sets from the incoming stage as input to the stage to be executed, this resolving the dependency. The runtime mediation program is considered part of the pipeline framework 110. Pseudocode is provided for this process in Listing. 2.

---

Listing. 2 - Runtime mediation logic.

---

```
INPUT:
    pipeline // an ordered set of stages to be executed by the compute framework
Initialize:
    datasets // a list of datasets output by each stage of the pipeline
    failed // a set of stages which failed to execute
// execute each stage of the pipeline in order
for stage in pipeline:
    // collect output datasets from each incoming stage
    inputDatasets := [ ]
    for depStage in stage.incoming:
        // if the incoming stage failed to execute skip it
        if failed.contains(depStage):
            continue
        inputDatasets.add(datasets[depStage])
    // verify stage has sufficient input datasets to execute
    if not stage.verify(inputDatasets):
        // if not then fail stage execution
        failed.add(stage)
        continue
    // execute the stage and store the output dataset
    datasets[stage], err := stage.execute(inputDatasets)
    // if stage execution failed add it to the failed set
    if err:
        failed.add(stage)
```

In data processing pipelines, the output data sets of a data processing pipeline are often used for different purposes in the surrounding software product. As a result of this, they may not need to be computed at the same time, in fact, sometimes one or more of the outputs may not be needed at all. An example is a data analytics package which allows customers to configure which analytics are executed.

In a conventional pipeline framework 110 this could be achieved in two ways. Either by a single pipeline which executes all analytics regardless of the customer configuration, or, by producing separate pipelines for each analytic. The first approach results in unnecessary work for the compute framework as the output stages, and any otherwise unneeded dependent stages, of the disabled analytics are not required by the customer. The second results in repeated work for the compute framework in executing the same input stage, and any direct dependent stages, once for each pipeline.

Cloud software products often operate with multiple customers sharing the same software instance on shared hardware infrastructure, the customers are referred to as tenants of the system, and the software as being multi-tenanted. In such an environment, the additional hardware resource requirements placed on the container orchestration system by the compute framework are a significant cost and performance consideration and the described method and system avoid such costs.

Figure 6:
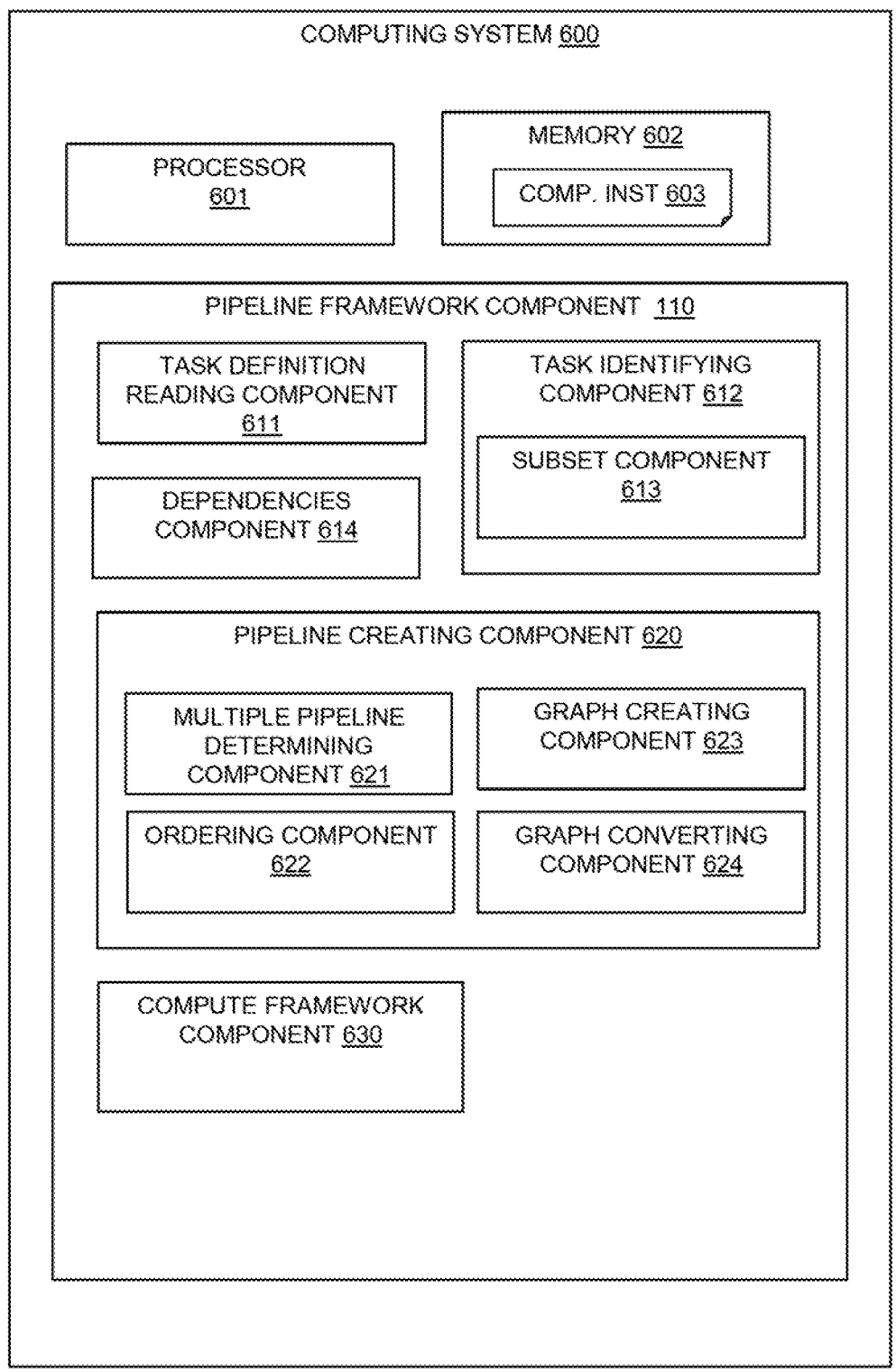
FIG. 6 is a block diagram of an example of a computer system in accordance with an embodiment of the present disclosure.

Referring to FIG. 6, a block diagram shows an example embodiment of a computing system 600 providing a pipeline framework component 110 using the described method.

The computing system 600 may include at least one processor 601, a hardware module, or a circuit for executing the functions of the described components which may be software units executing on the at least one processor. Multiple processors running parallel processing threads may be provided enabling parallel processing of some or all of the functions of the components. Memory 602 may be configured to provide computer instructions 603 to the at least one processor 601 to carry out the functionality of the components.

The pipeline framework component 110 may include a task definition reading component 611 for reading declaratively defined tasks as a number of stages of input data, data transformations, and output data and a task identifying component 612 for identifying one or more tasks to be currently executed. The task identifying component 612 may include a subset component 613 for identifying whether to divide the tasks into multiple subsets each of which may involve creating one or more optimized data processing pipelines.

The pipeline framework component 110 may include a dependencies component 614 for processing the identified tasks to determine dependencies between the tasks based on their defined stages. The dependencies component 614 may include analyzing each task for inbound data dependencies to define any directional dependencies between tasks and, where the identified one or more tasks to be executed is a subset of tasks defined declaratively, determining dependencies to resolve dependencies with stages from outside the subset.

The pipeline framework component 110 may include a pipeline creating component 620 for creating one or more optimized data processing pipelines by performing a dependency resolution procedure on stages of all tasks in parallel using the task dependencies to determine the order of the stages and removing duplication of stages between tasks.

The pipeline creating component 620 may include a multiple pipeline determining component 621 for creating one or more optimized data processing pipelines using a depth first search method or other suitable method. The pipeline creating component 620 may also include an ordering component 622 for using a topological sorting or other ordering method to order stages in a pipeline to satisfy dependencies and for deduplication of stages in a defined order.

The pipeline creating component 620 may include a graph constructing component 623 for constructing a dependency super graph of the stages of the tasks and a graph converting component 624 for converting the graph into one or more pipelines when the tasks are scheduled for execution.

The pipeline framework component 110 may include a compute framework component 630 for receiving one or more generated pipelines for execution using a runtime mediation to schedule stage execution and pass data between stages.

Figure 7:
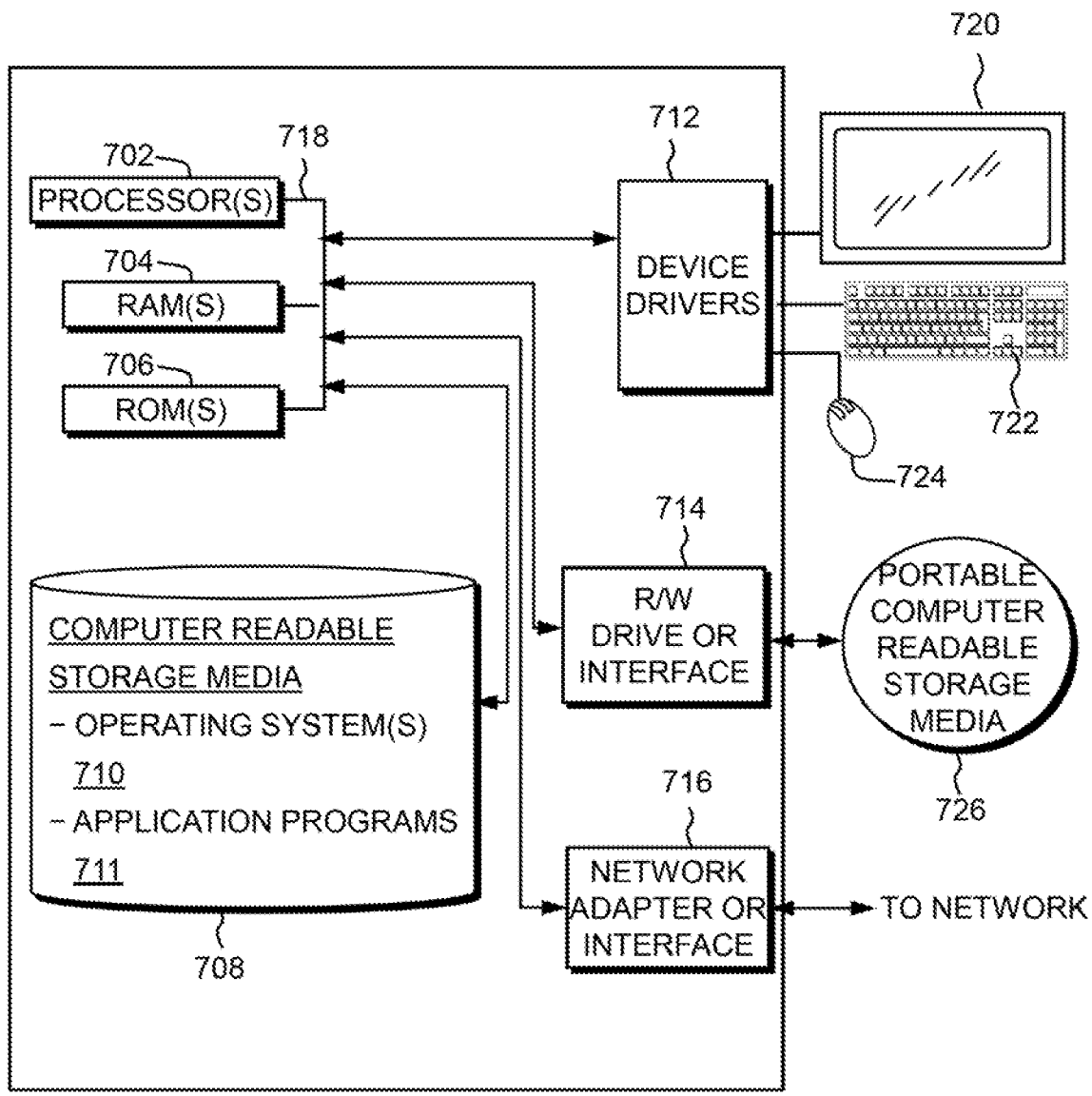
FIG. 7 is a block diagram of internal and external components of computers and servers in accordance with an embodiment of the present disclosure.

FIG. 7 depicts a block diagram of components of the computing system 600 of FIG. 6, in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing system 600 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710, and application programs 711, such as the pipeline framework component 110 are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing system 600 can also include a R/W drive or interface 714 to read from and write to one or more portable computer readable storage media 726. Application programs 711 on computing system 600 can be stored on one or more of the portable computer readable storage media 726, read via the respective R/W drive or interface 714 and loaded into the respective computer readable storage media 708.

Computing system 600 can also include a network adapter or interface 716, such as a TCP/IP adapter card or wireless communication adapter. Application programs 711 on computing system 600 can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing system 600 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
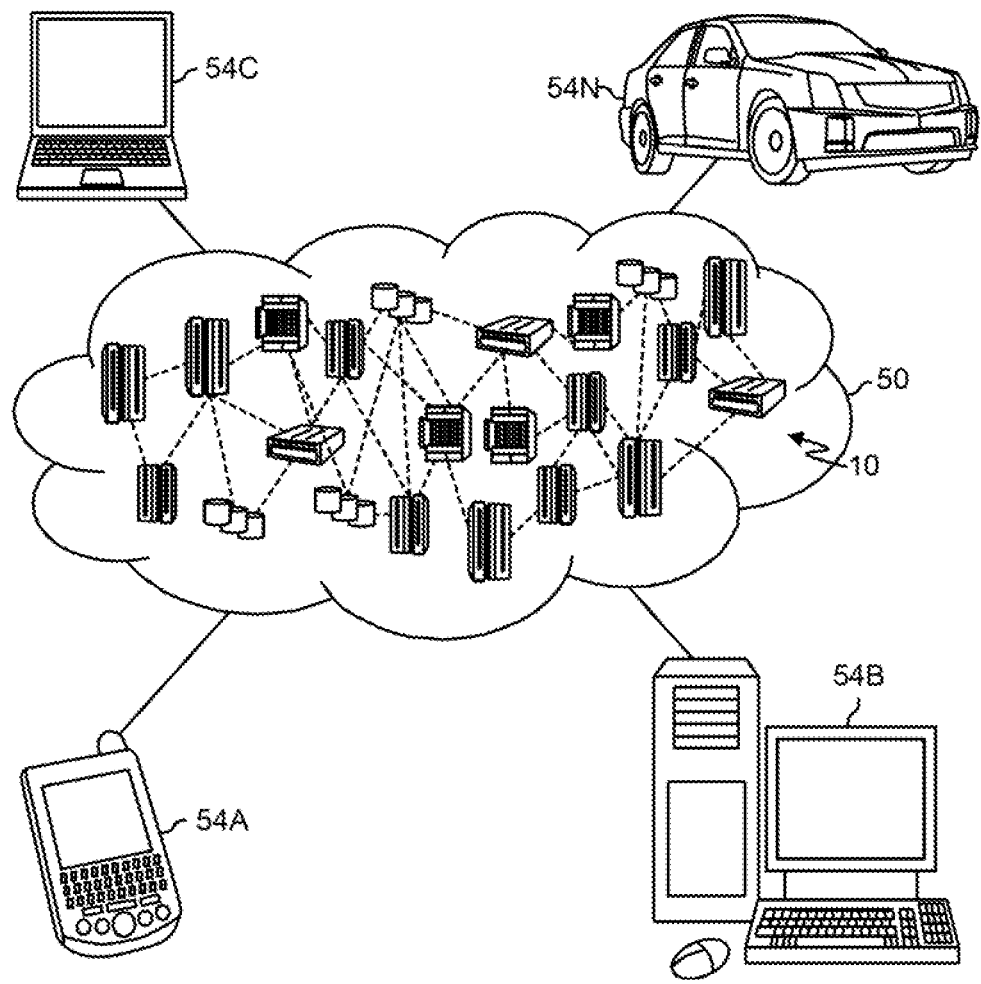
FIG. 8 is a block diagram of an illustrative cloud computing environment, in accordance with an embodiment of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
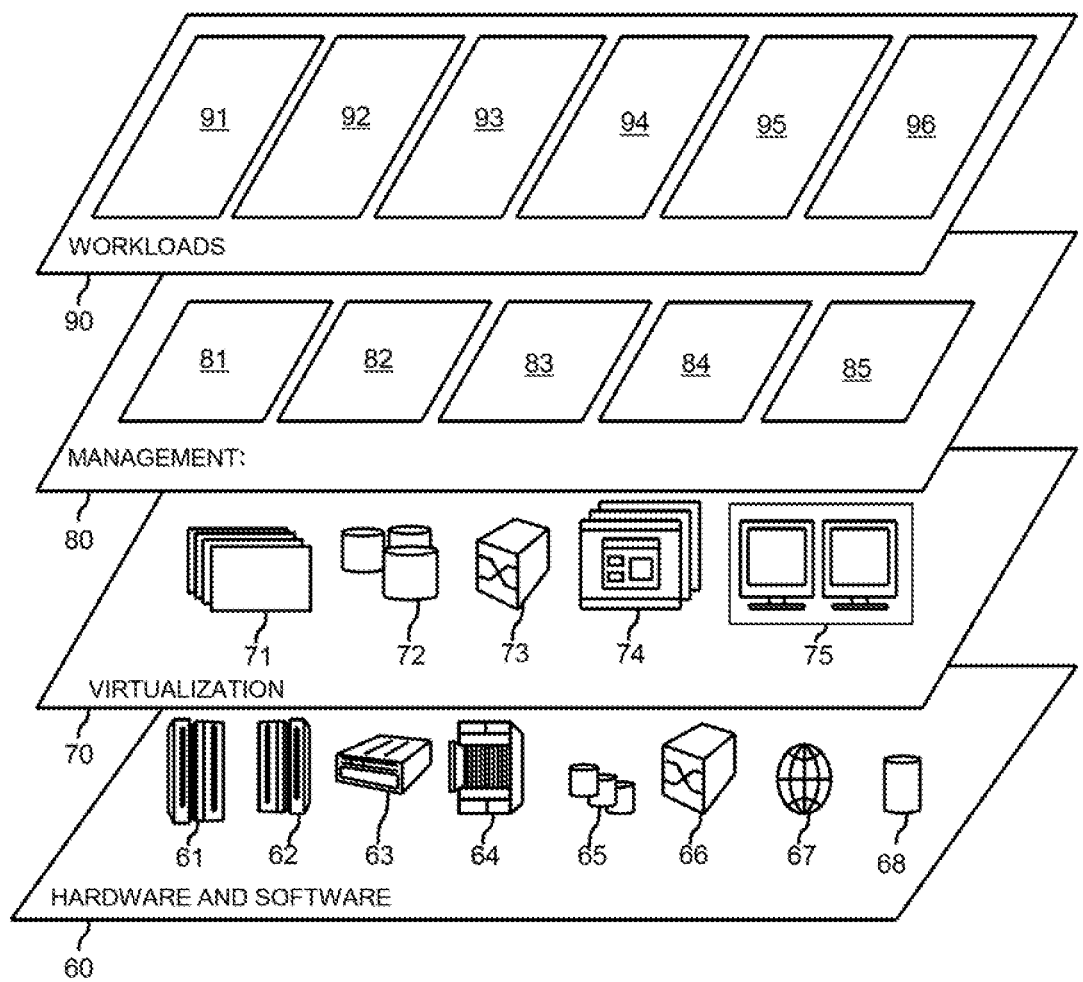
FIG. 9 is a block diagram of functional layers of the illustrative cloud computing environment of FIG. 8, in accordance with an embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing pipeline generating 96.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically generating an optimized processing pipeline, comprising:

identifying a pipeline to be optimized, wherein the pipeline is software framework in a virtualization layer of a container orchestration system, wherein the pipeline comprises one or more tasks to be performed on inbound data sets to achieve resultant data sets;

defining each task of the one or more tasks of the pipeline, wherein each task of the one or more tasks comprises one or more stages;

defining each stage of the one or more stages for each task of the one or more tasks, wherein each stage comprises a particular single data transformation of one or more inbound data sets to achieve one or more resultant data sets of each stage of the one or more stages;

defining input and output data set relationships between each stage of the one or more stages for each task of the one or more tasks;

determining data dependencies between each task of the one or more tasks, wherein a dependency comprises directional data dependencies between each task of the one or more tasks;

processing the one or more of tasks to determine a set of dependencies between each of the one or more tasks; and creating one or more optimized data processing pipelines by performing a dependency resolution procedure on each stage of the one or more stages for each task of the one or more tasks in parallel using the determined data dependencies, to determine an order of each stage of the one or more stages, and to remove duplication of a subset of stages of the one or more stages which are common to two or more tasks of the one or more the tasks.

2. The method as claimed in claim 1, wherein the one or more tasks of the pipeline is a subset of all tasks.

3. The method as claimed in claim 1, wherein
creating the one or more optimized data processing pipelines comprises constructing a dependency super graph of the one or more stages of each of the one or more tasks and converting the dependency super graph into one or more pipelines when the one or more tasks are scheduled for execution.

4. The method as claimed in claim 3, wherein
the dependency super graph is a directed acyclic graph (DAG) where nodes of the dependency super graph represent the one or more stages of each of the one or more tasks, and directed edges represent data dependencies between the one or more stages of each of the one or more tasks and which contains no cycles.

5. The method as claimed in claim 1, wherein
creating the one or more optimized data processing pipelines collates multiple tasks of the one or more tasks into one or more pipelines optimizing a pipeline's one or more stages in real time according to dynamically changing identified one or more tasks to be executed.

6. The method as claimed in claim 1, further comprising:
determining if the one or more optimized data processing pipelines is required by using a depth first search.

7. The method as claimed in claim 1, wherein
creating the one or more optimized data processing pipelines comprises topological sorting to order the one or more stages in the pipeline to satisfy the determined dependencies and for deduplication of one or more stages in a defined order.

8. The method as claimed in claim 1, wherein
dynamically identifying the tasks to be executed by selecting from a group consisting of: a schedule maintained by a pipeline framework, actions performed by a user, and reported state changes within a system.

9. The method as claimed in claim 1, wherein
identifying the tasks to be executed comprises identifying whether to divide the one or more tasks into multiple subsets each of which involve creating the one or more optimized data processing pipelines.

10. The method as claimed in claim 1, wherein
once the one or more optimized data processing pipelines are generated, passing to a compute framework for execution using a runtime mediation to schedule stage execution of the one or more stages and pass data between the one or more stages.

11. A computer program product for dynamically generating an optimized processing pipeline, the computer program product comprising:
one or more computer-readable storage media and program instructions stored on the one or more computer-readable storage media, the program instructions executable by a computing system to cause the computing system to perform a method comprising:
identifying a pipeline to be optimized, wherein the pipeline is software framework in a virtualization layer of a container orchestration system, wherein the pipeline comprises one or more tasks to be performed on inbound data sets to achieve resultant data sets;
defining each task of the one or more tasks of the pipeline, wherein each task of the one or more tasks comprises one or more stages;
defining each stage of the one or more stages for each task of the one or more tasks, wherein
each stage comprises a particular single data transformation of one or more inbound data sets to achieve one or more resultant data sets of each stage of the one or more stages;
defining input and output data set relationships between each stage of the one or more stages for each task of the one or more tasks;
determining data dependencies between each task of the one or more tasks, wherein a dependency comprises directional data dependencies between each task of the one or more tasks;
processing the one or more of tasks to determine a set of dependencies between each of the one or more tasks; and
creating one or more optimized data processing pipelines by performing a dependency resolution procedure on each stage of the one or more stages for each task of the one or more tasks in parallel using the determined data dependencies, to determine an order of each stage of the one or more stages, and to remove duplication of a subset of stages of the one or more stages which are common to two or more tasks of the one or more the tasks.

12. The computer program product as claimed in claim 11, wherein
where the one or more tasks of the pipeline is a subset of all tasks.

13. The computer program product as claimed in claim 11, wherein
creating the one or more optimized data processing pipelines comprises constructing a dependency super graph of the one or more stages of each of the one or more tasks and converting the dependency super graph into one or more pipelines when the one or more tasks are scheduled for execution.

14. The computer program product as claimed in claim 13, wherein
the dependency super graph is a directed acyclic graph (DAG) where nodes of the dependency super graph represent the one or more stages of each of the one or more tasks, and directed edges represent data dependencies between the one or more stages of each of the one or more tasks and which contains no cycles.

15. The computer program product as claimed in claim 11, wherein
creating the one or more optimized data processing pipelines collates multiple tasks of the one or more tasks into one or more pipelines optimizing a pipeline's one or more stages in real time according to dynamically changing identified one or more tasks to be executed.

16. The computer program product as claimed in claim 11, further comprising:
determining if the one or more optimized data processing pipelines is required by using a depth first search.

17. The computer program product as claimed in claim 11, wherein
creating the one or more optimized data processing pipelines comprises topological sorting to order the one or more stages in the pipeline to satisfy the determined dependencies and for deduplication of one or more stages in a defined order.

18. The computer program product as claimed in claim 11, wherein
dynamically identifying the tasks to be executed by selecting from a group consisting of: a schedule maintained by a pipeline framework, actions performed by a user, and reported state changes within a system.

19. The computer program product as claimed in claim 11, wherein
identifying the tasks to be executed comprises identifying whether to divide the one or more tasks into multiple subsets each of which involve creating the one or more optimized data processing pipelines.

20. A computer system for dynamically generating an optimized processing pipeline, the computer system comprising:
one or more computer processors, one or more computer-readable storage media, and program instructions stored on the one or more of the computer-readable storage media for execution by at least one of the one or more processors, wherein the computer system is capable of performing a method comprising:
identifying a pipeline to be optimized, wherein the pipeline is software framework in a virtualization layer of a container orchestration system, wherein the pipeline comprises one or more tasks to be performed on inbound data sets to achieve resultant data sets;
defining each task of the one or more tasks of the pipeline, wherein each task of the one or more tasks comprises one or more stages;
defining each stage of the one or more stages for each task of the one or more tasks, wherein each stage comprises a particular single data transformation of one or more inbound data sets to achieve one or more resultant data sets of each stage of the one or more stages;
defining input and output data set relationships between each stage of the one or more stages for each task of the one or more tasks;
determining data dependencies between each task of the one or more tasks, wherein a dependency comprises directional data dependencies between each task of the one or more tasks;
processing the one or more of tasks to determine a set of dependencies between each of the one or more tasks; and
creating one or more optimized data processing pipelines by performing a dependency resolution procedure on each stage of the one or more stages for each task of the one or more tasks in parallel using the determined data dependencies, to determine an order of each stage of the one or more stages, and to remove duplication of a subset of stages of the one or more stages which are common to two or more tasks of the one or more the tasks.

* * * * *